US010800287B2

(12) United States Patent
Vallender et al.

(10) Patent No.: US 10,800,287 B2
(45) Date of Patent: Oct. 13, 2020

(54) VEHICLE RECHARGEABLE ENERGY STORAGE SYSTEM AND METHOD OF PRECONDITIONING THE RECHARGEABLE ENERGY STORAGE SYSTEM

(71) Applicant: GM GLOBAL TECHNOLOGY OPERATIONS LLC, Detroit, MI (US)

(72) Inventors: Joshua A. Vallender, Whitmore Lake, MI (US); Brandon R. Jones, White Lake, MI (US); William M. Hare, Farmington Hills, MI (US); Jeanette C. Kurnik, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 197 days.

(21) Appl. No.: 16/104,571

(22) Filed: Aug. 17, 2018

(65) Prior Publication Data
US 2020/0055406 A1 Feb. 20, 2020

(51) Int. Cl.
| H01M 10/48 | (2006.01) |
| H01M 10/625 | (2014.01) |
| H01M 10/615 | (2014.01) |
| B60L 58/27 | (2019.01) |
| H01M 10/63 | (2014.01) |
| B60L 58/12 | (2019.01) |
| B60L 53/10 | (2019.01) |

(52) U.S. Cl.
CPC ............ *B60L 58/27* (2019.02); *B60L 58/12* (2019.02); *H01M 10/486* (2013.01); *H01M 10/615* (2015.04); *H01M 10/625* (2015.04); *H01M 10/63* (2015.04); *B60L 53/11* (2019.02)

(58) Field of Classification Search
CPC .... H01M 10/48; H01M 10/625; H01M 10/63; B60L 11/18
See application file for complete search history.

(56) References Cited

U.S. PATENT DOCUMENTS

2014/0277869 A1* 9/2014 King ................. B60H 1/00278
701/22
2016/0288659 A1* 10/2016 Hammoud ............ B60L 11/187

* cited by examiner

*Primary Examiner* — Kenneth J Douyette
(74) *Attorney, Agent, or Firm* — Reising Ethington, P.C.

(57) ABSTRACT

A system and method are provided for preconditioning a rechargeable energy system (RESS) for a vehicle. The method includes monitoring one or more rechargeable energy storage system parameters; adjusting a rechargeable energy storage system precondition window based on one or more of the monitored rechargeable energy storage system parameters; and prompting for or activating thermal preconditioning of the rechargeable energy storage system at least partially depending on the adjusted rechargeable energy storage system precondition window.

19 Claims, 6 Drawing Sheets

VEHICLE RECHARGEABLE ENERGY STORAGE SYSTEM AND METHOD OF PRECONDITIONING THE RECHARGEABLE ENERGY STORAGE SYSTEM

INTRODUCTION

The field of technology generally relates to rechargeable energy storage systems for vehicles and, more particularly, to effectively charging rechargeable energy storage systems for vehicles.

In certain instances, such as periods of hot or cold ambient temperatures, recharging a rechargeable energy storage system (RESS) may be undesirably impacted. Particularly when using a fast charging station (e.g., a DC fast charge or DCFC), charging capability can be limited. For example, customers and/or autonomous vehicles pulling up to fast charging stations and expecting the advertised energy transfer rate (e.g., 55 kW), may have to spend more time and money at the charging station to achieve a desired charge status.

SUMMARY

According to one embodiment, there is provided a method of preconditioning a rechargeable energy storage system of a vehicle, the method comprising the steps of: monitoring one or more rechargeable energy storage system parameters; adjusting a rechargeable energy storage system precondition window based on one or more of the monitored rechargeable energy storage system parameters, wherein the rechargeable energy storage system precondition window comprises a rechargeable energy storage system precondition start point, a rechargeable energy storage system precondition end point, and a rechargeable energy storage system precondition region between the rechargeable energy storage system precondition start point and the rechargeable energy storage system precondition end point; and prompting for or activating thermal preconditioning of the rechargeable energy storage system at least partially depending on the adjusted rechargeable energy storage system precondition window.

According to various embodiments, this method may further include any one of the following features or any technically-feasible combination of these features:
- the thermal preconditioning of the rechargeable energy storage system includes increasing a temperature of the rechargeable energy storage system;
- the step of increasing the temperature of the rechargeable energy storage system increases the temperature in an amount that is proportional to an expected loss of charging efficiency;
- the step of increasing the temperature of the rechargeable energy storage system increases the temperature of the rechargeable energy storage system to a value higher than an average operational temperature of the rechargeable energy storage system;
- a lower rechargeable energy storage system temperature is maintained outside of the rechargeable energy storage system precondition window as compared to a temperature of the rechargeable energy storage system during thermal preconditioning;
- the thermal preconditioning takes place while the vehicle is propulsion active;
- the one or more rechargeable energy storage system parameters includes a state of charge (SOC), and the rechargeable energy storage system precondition window is an SOC-based window;
- the rechargeable energy storage system precondition region is between 20-40% state of charge (SOC), inclusive;
- the rechargeable energy storage system parameters include an ambient temperature or a rechargeable energy storage system temperature;
- the rechargeable energy storage system precondition start point correlates with the ambient temperature or the rechargeable energy storage system temperature;
- a non-precondition rechargeable energy storage system region exists between a maximum state of charge (SOC) and the rechargeable energy storage system precondition start point;
- the non-precondition rechargeable energy storage system region allows for more range efficient use of the rechargeable energy storage system than an activated thermal preconditioning mode;
- the prompting for or activating step includes calculating a time period until the rechargeable energy storage system precondition start point is expected to be reached;
- a user precondition prompt is presented to a user of the vehicle during the time period;
- the one or more rechargeable energy storage system parameters includes an estimated distance to a fast charging station;
- the one or more rechargeable energy storage system parameters includes an estimated time to a fast charging station;
- the one or more rechargeable energy storage system parameters includes an autonomous schedule; and/or
- the rechargeable energy storage system precondition end point preserves rechargeable energy storage system capacity in a non-precondition rechargeable energy storage system region.

According to another embodiment, there is provided a method of preconditioning a rechargeable energy storage system of a vehicle, the method comprising the steps of: monitoring a plurality of rechargeable energy storage system parameters, wherein the plurality of rechargeable energy storage system parameters includes a state of charge (SOC) and an ambient or rechargeable energy storage system temperature; adjusting an SOC-based rechargeable energy storage system precondition window based on the ambient or rechargeable energy storage system temperature, wherein the SOC-based rechargeable energy storage system precondition window comprises a rechargeable energy storage system precondition start point, a rechargeable energy storage system precondition end point, and a rechargeable energy storage system precondition region between the rechargeable energy storage system precondition start point and the rechargeable energy storage system precondition end point; and prompting for or activating thermal preconditioning of the rechargeable energy storage system at least partially depending on the adjusted SOC-based rechargeable energy storage system precondition window.

According to another embodiment, there is provided a rechargeable energy storage system for a vehicle, comprising: a battery; a heater; and a controller configured to monitor one or more rechargeable energy storage system parameters, adjust a rechargeable energy storage system precondition window based on one or more of the monitored rechargeable energy storage system parameters, wherein the rechargeable energy storage system precondition window comprises a rechargeable energy storage system precondition start point, a rechargeable energy storage system precondition end point, and a rechargeable energy storage system precondition region between the rechargeable energy storage system precondition start point and the rechargeable energy storage system precondition end point, and prompt for or activate thermal preconditioning at least partially depending on the adjusted rechargeable energy storage system precondition window, wherein thermal preconditioning uses the heater to heat the battery.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

The method and system described herein relate to preconditioning a rechargeable energy storage system (RESS) in order to optimize charging efficiency. A dynamic precondition strategy can help maximize energy transfer efficiency without undesirably impacting RESS performance. The RESS can be preconditioned in accordance with the disclosed methods, to maximize energy transfer into the RESS for shorter durations. The methodology can be applied to non-autonomous, semi-autonomous, and autonomous vehicles (with or without a driver). In one embodiment, the method can selectively control preconditioning to allow the RESS to remain at a lower temperature during normal operation, and then ramp up and precondition in a precondition window prior to energy transfer. Typically, battery conditioning is more statically implemented, or occurs during the charging session, which can be disadvantageous as the RESS charges at a significantly reduced rate until conditioning is accomplished. Accordingly, a user will receive less charge in a longer period of time, and will likely have to spend more money. The systems and methods described herein are advantageous for improved vehicle energy transfer performance, battery life, and in fleet applications where charging resources may be limited. Additionally, certain examples are provided in terms of thermal preconditioning that heats or increases the temperature of the RESS, but it is also possible in some embodiments to implement thermal preconditioning that cools or decreases the temperature of the RESS.

System—

Figure 1:
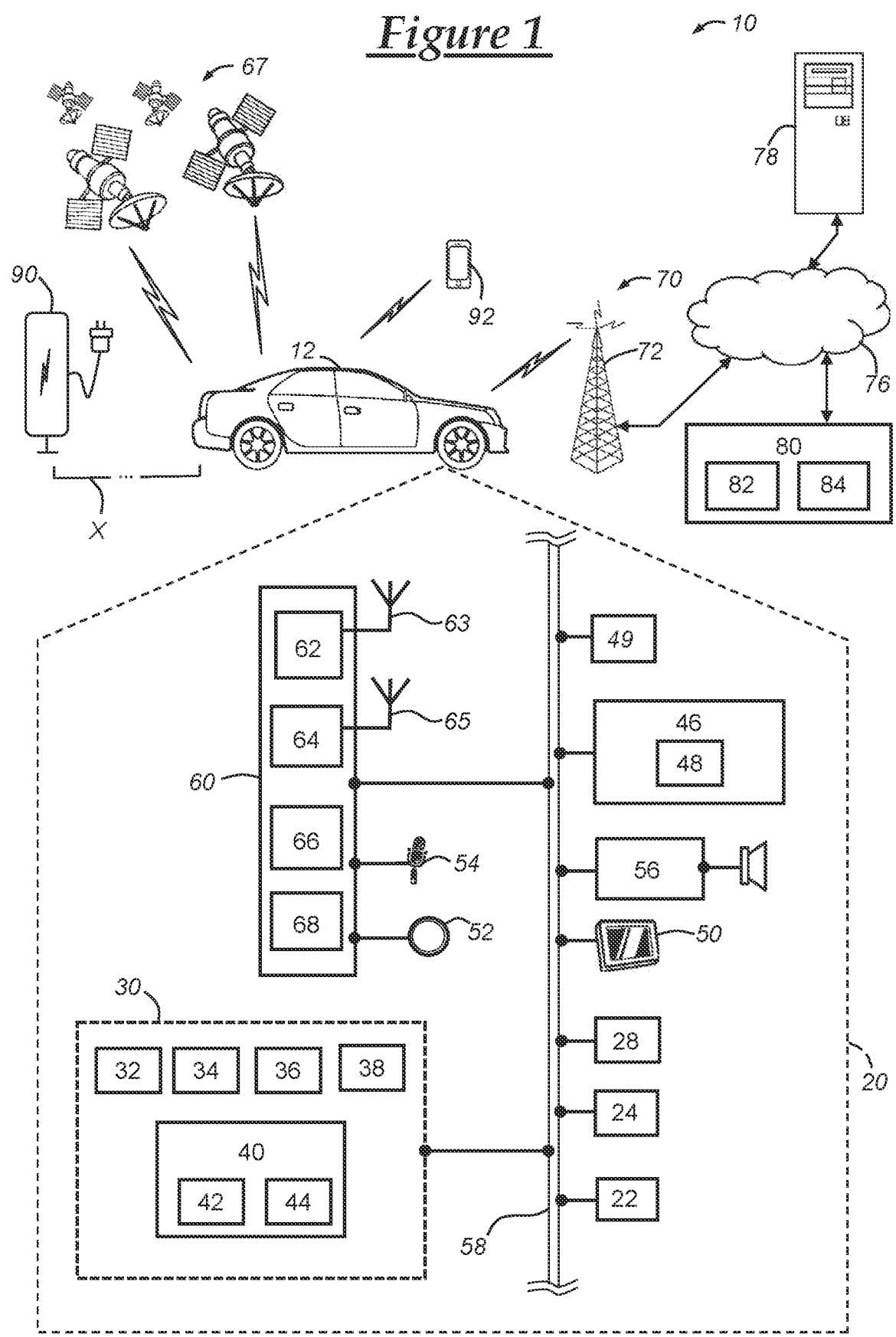
FIG. 1 is a schematic representation of an operating environment and a vehicle having a rechargeable energy storage system (RESS) that is capable of utilizing various embodiments of the method disclosed herein.

With reference to FIG. 1, there is shown an operating environment 10 that can be used to implement the method disclosed herein. Operating environment 10 generally includes a vehicle 12 with vehicle electronics 20, including a rechargeable energy storage system (RESS) 30. Additionally, the operating environment 10 includes a cellular carrier system 70, a backend facility 80, and a fast charging station 90 for charging the RESS 30. It should be understood that the disclosed method can be used with any number of different systems and is not specifically limited to the operating environment shown here. The following paragraphs provide a brief overview of one such operating environment 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and include a global navigation satellite system (GNSS) receiver 22, body control module or unit (BCM) 24, other vehicle system modules (VSMs) 28, the RESS 30, controller 40, HVAC system 46, ambient temperature sensor 48, movement sensor(s) 49, vehicle-user interfaces 50-56, and wireless communication device 60. In the illustrated embodiment, the vehicle 12 is a battery electric vehicle (BEV) that primarily uses the RESS 30 for propulsion. However, in other embodiments, the vehicle 12 can be a hybrid (e.g., a plug-in hybrid electric vehicle (PHEV)), a fuel cell electric vehicle (FCEV), or another type of electric vehicle. Some or all of the different vehicle electronics may be connected for communication with each other via one or more communication busses, such as bus 58. Communications bus 58 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. In other embodiments, each of the VSMs can communicate using a wireless network and can include suitable hardware, such as short-range wireless communications (SRWC) circuitry.

The vehicle 12 can include numerous vehicle system modules (VSMs) as part of vehicle electronics 20, such as the GNSS receiver 22, BCM 24, the RESS 30, controller 40, HVAC system 46, ambient temperature sensor 48, movement sensor(s) 49, vehicle-user interfaces 50-56, and wireless communication device 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is connected by communications bus 58 to the other VSMs, as well as to the wireless communications device 30. One or more VSMs 28 may periodically or occasionally have their software or firmware updated and, in some embodiments, such vehicle updates may be over the air (OTA) updates that are received from a computer 78 or backend facility 80 via land network 76 and communications device 60. As is appreciated by those skilled in the art, the above-mentioned VSMs are only examples of some of the modules that may be used in vehicle 12, as numerous others are also possible.

Global navigation satellite system (GNSS) receiver 22 receives radio signals from a constellation of GNSS satellites 67. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 67. The GNSS receiver 22 can include at least one processor and memory, including a non-transitory computer readable memory storing instructions (software) that are accessible by the processor for carrying out the processing performed by the receiver 22.

GNSS receiver 22 may be used to provide navigation and other position-related services to the vehicle operator, or may be used in various control schemes in implementations where the vehicle 12 is autonomous or semi-autonomous. Navigation information can be presented on the display 50 (or other display within the vehicle such as an application program on mobile device 92) or can be presented verbally such as is done when supplying turn-by-turn navigation. The navigation services can be provided using a dedicated in-vehicle navigation module (which can be part of GNSS receiver 22 and/or incorporated as a part of wireless communications device 60 or other VSM), or some or all navigation services can be done via the vehicle communications device 60 (or other telematics-enabled device) installed in the vehicle, wherein the position or location information is sent to a remote location for purposes of providing the vehicle with navigation maps, map annotations (points of interest, locations of charging stations, etc.), route calculations, and the like. The position information can be supplied to the vehicle backend facility 80 or other remote computer system, such as computer 78, for other purposes, such as fleet management and/or for use in the RESS preconditioning methods discussed below. Also, new or updated map data, such as that geographical roadway map data stored on databases 84, can be downloaded to the GNSS receiver 22 from the backend facility 80 via vehicle communications device 60, as well as energy usage prediction information and/or planned route information.

Body control module (BCM) 24 can be used to control various VSMs of the vehicle, as well as obtain information concerning the VSMs, including their present state or status, as well as sensor information. BCM 24 is shown in the exemplary embodiment of FIG. 1 as being electrically coupled to communication bus 58. In some embodiments, the BCM 24 may be integrated with or part of a center stack module (CSM) and/or integrated with wireless communications device 60. Or, the BCM may be a separate device that is connected to other VSMs via bus 58. BCM 24 may communicate with wireless device 60 and/or one or more vehicle system modules, such as the RESS 30, the HVAC system 46, ambient temperature sensor 48, movement sensor(s) 49, audio system 56, or other VSMs 28. BCM 24 can include a processor and/or memory, which can be similar to processor 42 and memory 44 of the controller 40, or processor 66 and memory 68 of wireless communications device 60, as discussed below. Software stored in the memory and executable by the processor enables the BCM to direct one or more vehicle functions or operations including, for example, controlling central locking, air conditioning (or other HVAC 46 functions), power mirrors, controlling the vehicle primary mover (e.g., engine, primary propulsion system), and/or controlling various other vehicle modules. For example, the BCM 24 can send signals to other VSMs, such as a request to perform a particular operation or a request for sensor information and, in response, the sensor may then send back the requested information. And, the BCM 24 may receive data from VSMs, including battery information from RESS 30, temperature or other climate information from ambient temperature sensor 48, and various other information from other VSMs.

Additionally, the BCM 24 may provide vehicle state information corresponding to the vehicle state or of certain vehicle components or systems, including the VSMs discussed herein. For example, the BCM 24 may provide the device 60 with information indicating whether the vehicle's primary propulsion system is engaged or in an active (or ready) state, battery information from the RESS 30, and/or other information regarding the vehicle. The information can be sent to the wireless communications device 60 (or other central vehicle computer) automatically upon receiving a request from the device/computer, automatically upon certain conditions being met, or periodically (e.g., at set time intervals). As discussed in more detail below, the BCM 24 can be configured with one or more triggers that, when a condition is satisfied, the BCM performs some operation, such as sending sensor information to the wireless communications device 60 (or to another device or entity, such as backend facility 80). In this way, the BCM 24 can filter information based on predetermined or predefined triggers and pass the filtered information on to other VSMs, including the RESS 30 or the wireless communications device 60 (or other central vehicle computer).

The RESS 30 can provide energy for propulsion of the vehicle 12, and may be supplemented with one or more engines or motors. The RESS 30 is included as a part of the vehicle electronics 20 and includes an electric battery pack 32, a battery SOC sensor 34, a battery temperature sensor 36, a heater 38, and a controller 40. The electric battery pack 32 can be a traction battery or an electric-vehicle battery that is used to provide propulsion for the vehicle 12. As mentioned above, the vehicle 12 can be an electric vehicle or a hybrid vehicle and, in such cases, the vehicle 12 can include an electric battery pack 32. A separate lower voltage battery (e.g., 12V) for powering various VSMs and other components of the vehicle electronics 20 may also be included as part of the RESS 30. In one embodiment, the electric battery pack 32 is a lithium-ion battery pack that includes a plurality of lithium-ion batteries. Other types of batteries, such as lead acid, nickel metal hydride, sodium ion, or sodium nickel chloride, to cite a few examples, could be used as appreciated by those skilled in the art.

The battery state of charge (SOC) sensor 34 is an onboard vehicle sensor and can be any of a variety of electrical components that can measure the state of charge of the electric battery pack 32. In one embodiment, the battery SOC sensor 34 can use (or can be) a voltage sensor, such as a dedicated voltmeter that is attached at a positive terminal of the battery pack 32 and at a negative terminal of the battery pack 32. In another embodiment, the battery SOC sensor 34 can use other techniques, such as chemical methodologies that can be used to measure the specific gravity of pH of the electrolytes contained within the battery pack 32, coulomb counting methodologies, Kalman filtering processes (e.g., using voltage and battery temperatures in a Kalman filtering process), pressure methodologies, or a combination thereof. The battery SOC sensor 34 can be configured in various ways, as appreciated by those skilled in the art. The battery SOC sensor 34 can provide sensor information to a computing device of the vehicle 12, such as the controller 40 or wireless communications device 60, for purposes of determining a SOC level, which can be represented as a percentage of the full-charge capacity of the electric battery pack 32.

The battery temperature sensor 36 can be a thermocouple or digital thermometer that is coupled to the electric battery pack 32 such that the battery temperature sensor 36 can measure a temperature of the electric battery pack 32 or the RESS 30. In one embodiment, the battery temperature sensor 36 can be used to obtain a SOC of the electric battery pack 32, or may be a part of the battery SOC sensor 34 and used in combination with other sensors, such as a voltmeter.

The heater 38 may be used in thermal preconditioning to increase the temperature of the electric battery pack 32 based on feedback from controller 40. The heater 38 may be a separate element or component, or it may be integrated with the electric battery pack 32. In one embodiment, the heater 38 is a surface heater that is used to precondition the electric battery pack 32 prior to a charging event, such as at the fast charging station 90. The heater 38 may be a wet or dry surface heater, for example. In another embodiment, the heater 38 is a heat pump or heat return loop that provides heat from another location in vehicle 12. For example, if the vehicle is a hybrid electric vehicle, heat from an internal combustion engine may be used to heat the RESS 30.

Controller 40 includes an electronic processor 42 and memory 44, and may be used to implement the preconditioning methods described herein. The controller 40 (control unit, control module, etc.) may be an integrated battery controller or it may be a separate controller. The controller 40 may also be integrated with or otherwise a part of another vehicle system or component, such as the BCM 24. Accordingly, the controller 40 is not limited to any one particular embodiment or arrangement and may be used by the present method to control one or more aspects of the RESS 30.

Processor 42 can be any type of device capable of processing electronic instructions including microprocessors, microcontrollers, host processors, controllers, vehicle communication processors, and application specific integrated circuits (ASICs). It can be a dedicated processor used only for the RESS 30, or it can be shared with other vehicle systems. Processor 42 executes various types of digitally-stored instructions, such as software or firmware programs stored in memory 44, which enable strategic control of the RESS 30. For instance, processor 42 can execute programs or process data to carry out at least a part of the method discussed herein. Memory 44 may be a temporary powered memory, any non-transitory computer-readable medium, or other type of memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. Similar components to those previously described (processor 42 and/or memory 44) can be included in the BCM 24 and/or various other VSMs that typically include such processing/storing capabilities.

The vehicle 12 includes various onboard vehicle sensors 34, 36, 48, 49. Also, certain vehicle-user interfaces 50-54 can be utilized as onboard vehicle sensors. Generally, the sensors 34, 36, 48, 49 can obtain information pertaining to either the vehicle operating state or the vehicle environmental state. The sensor information can be sent to other VSMs, such as BCM 24, controller 40, and/or the vehicle communications device 60, via communications bus 58. Also, in some embodiments, the sensor data can be sent with metadata, which can include data identifying the sensor (or type of sensor) that captured the sensor data, a timestamp (or other time indicator), and/or other data that pertains to the sensor data, but that does not make up the sensor data itself. The vehicle operating state refers to a state of the vehicle concerning the operation of the vehicle, which can include the operation of the primary mover (e.g., vehicle propulsion motors or battery pack 32). Additionally, the vehicle operating state can include the vehicle state concerning mechanical operations of the vehicle or electrical states of the vehicle. The vehicle environmental state refers to a vehicle state concerning the interior of the cabin and the nearby, exterior area surrounding the vehicle. The vehicle environmental state includes behavior of a driver, operator, or passenger, as well as traffic conditions, roadway conditions and features, and statuses of areas nearby the vehicle.

The heating, ventilation, and air conditioning (HVAC) system 46 can be used to provide heating and air conditioning to an interior cabin or passenger cabin of the vehicle 12. The HVAC system 46 can include a compressor, a condenser, an evaporator, an ambient temperature sensor 48, a heating core, a blower fan, and an HVAC control system, as well as various other components. The HVAC control system can be incorporated with another VSM of the vehicle 12, or may include separate components. And, in some embodiments, the HVAC system 46 can be at least partly incorporated into another VSM, but can also include separate circuitry used for controlling the HVAC system 46. In addition to the ambient temperature sensor 48, the HVAC system 46 can include a variety of sensors, such as pressure sensors. Sensor readings from these onboard sensors can be sent to other vehicle modules, such as the controller 40 or the wireless communications device 60.

The ambient temperature sensor 48 is a digital thermometer that can detect the temperature of the air outside of the vehicle 12 and/or within an interior cabin of the vehicle 12, such as within a passenger cabin of the vehicle. In other embodiments, the ambient temperature sensor 48 can be another type of temperature sensing device. In the illustrated embodiment, the ambient temperature sensor 48 is a part of the HVAC system 46 and can be used to provide information to the HVAC control system, as well as provide information to the RESS 30 and/or one or more users of the vehicle via display 50 or other vehicle-user interface. In other embodiments, the ambient temperature sensor 48 can be separate from the HVAC system 40, or a second (or additional) temperature sensors can be included in the vehicle 12. Additionally, in at least some embodiments, the vehicle 12 can include a transmission temperature sensor or thermometer that measures the temperature of the transmission. These sensor readings from the temperature sensors can be sent to other VSMs, such as the controller 40 and/or the wireless communications device 60. The wireless communications device 60 can then send these sensor values to the backend facility 80 or other remote system.

The movement sensors 49 can be used in some implementations to obtain movement and/or inertial information concerning the vehicle 12, such as vehicle speed, acceleration, yaw (and yaw rate), pitch, roll, and various other attributes of the vehicle concerning its movement as measured locally through use of onboard vehicle sensors. The movement sensors 49 can be mounted on the vehicle in a variety of locations, such as within an interior vehicle cabin, on a front or back bumper of the vehicle, and/or on the hood of the vehicle 12. The movement sensors 49 can be coupled to various other VSMs directly or via communications bus 58. Movement sensor data can be obtained and sent to the other VSMs, including BCM 24, controller 40, and/or wireless communications device 60.

Additionally, the vehicle 12 can include other sensors not mentioned above, including ranging sensors (i.e., sensors used to detect the range between the vehicle and another object, such as through use of radar or lidar), other radars, other lidars, cameras, parking sensors, lane change and/or blind spot sensors, lane assist sensors, tire-pressure sensors, fluid level sensors (including a fuel level sensor), brake pad wear sensors, a V2V communication unit, rain or precipitation sensors (e.g., infrared light sensor(s) directed toward the windshield (or other window of the vehicle 12) to detect rain or other precipitation based on the amount of reflected light), and additional interior or exterior temperature sensors.

Wireless communications device 60 is capable of communicating data via short-range wireless communications (SRWC) and/or via cellular network communications through use of a SRWC circuit 62 and a cellular chipset 64, as depicted in the illustrated embodiment. In one embodiment, the wireless communications device 60 is a central vehicle computer that may be used to carry out at least part of the method discussed below. In the illustrated embodiment, wireless communications device 60 includes an SRWC circuit 62, a cellular chipset 64, a processor 66, memory 68, and antennas 63 and 65. In one embodiment, wireless communications device 60 may be a standalone module or, in other embodiments, device 60 may be incorporated or included as a part of one or more other vehicle system modules, such as a center stack module (CSM), BCM 24, an infotainment module, a head unit, and/or a gateway module. In some embodiments, the device 60 can be implemented as an OEM-installed (embedded) or aftermarket device that is installed in the vehicle. In some embodiments, the wireless communications device 60 is a telematics unit (or telematics control unit) that is capable of carrying out cellular communications using one or more cellular carrier systems 70. The telematics unit can be integrated with the GNSS receiver 22 so that, for example, the GNSS receiver 22 and the wireless communications device (or telematics unit) 60 are directly connected to one another as opposed to being connected via communications bus 58.

In some embodiments, the wireless communications device 60 can be configured to communicate wirelessly according to one or more short-range wireless communications (SRWC) such as any of the Wi-Fi™, WiMAX™, Wi-Fi Direct™ other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 62 enables the wireless communications device 60 to transmit and receive SRWC signals, such as BLE signals. The SRWC circuit 62 may allow the device 60 to connect to another SRWC device. Additionally, in some embodiments, the wireless communications device may contain a cellular chipset 64 thereby allowing the device to communicate via one or more cellular protocols, such as those used by cellular carrier system 70.

Wireless communications device 60 may enable vehicle 12 to be in communication with one or more remote networks (e.g., one or more networks at backend facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 60 can be configured with a static IP address or can be set up to automatically receive an assigned IP address from another device on the network such as a router or from a network address server.

Packet-switched data communications may also be carried out via use of a cellular network that may be accessible by the device 60. Communications device 60 may, via cellular chipset 64, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

The wireless communications device 60 is connected to the bus 58, and can receive sensor data from one or more onboard vehicle sensors 34, 36, 48, 49 and, thereafter, the vehicle 12 can send this data (or other data derived from or based on this data) to other devices or networks, including the off-board vehicle backend facility 80 or the on-board controller 40. And, in another embodiment, the wireless communications device 60 can be incorporated with or at least connected to a navigation system that includes geographical map information including geographical roadway map data and/or a data from an energy usage prediction plan. The navigation system can be communicatively coupled to the GNSS receiver 22 (either directly or via communications bus 58) and can include an on-board geographical map database that stores local geographical map information. This local geographical map information can be provisioned in the vehicle and/or downloaded via a remote connection to a geographical map database/server, such as computer 78 and/or backend facility 80 (including servers 82 and databases 84). The on-board geographical map database can store geographical map information corresponding to a location or region of the vehicle so as to not include a large amount of data, much of which may never be used. Moreover, as the vehicle 12 enters different locations or regions, the vehicle can inform the vehicle backend services facility 80 of the vehicle's location (e.g., obtained via use of GNSS receiver 22) and, in response to receiving the vehicle's new location, the servers 82 can query databases 84 for the corresponding geographical map information, which can then be sent to the vehicle 12. The geographical map information may include, in some embodiments, locations of fast charging stations such as the fast charging station 90.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. Vehicle-user interfaces 50-54 are also onboard vehicle sensors that can receive input from a user or other sensory information. The pushbutton(s) 52 allow manual user input into the communications device 60 to provide other data, response, or control input. Audio system 56 provides audio output to a vehicle occupant and can be a dedicated, standalone system or part of the primary vehicle audio system. According to the particular embodiment shown here, audio system 56 is operatively coupled to both vehicle bus 58 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 60 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Display 50 may be used to provide a graphical user interface (GUI) for the user to precondition the RESS 30 prior to a fast charging session. Various other vehicle-user interfaces can also be utilized, such as the mobile device 92, as the interfaces of FIG. 1 are only an example of one particular implementation.

A user of the vehicle 12 can use one or more vehicle-user interfaces 50-54, as discussed more below, to input a destination or activate thermal preconditioning via the controller 40, to cite a few examples. In one embodiment, the user can operate one or more vehicle-user interfaces 50-56, which can then deliver inputted information to other VSMs, such as the controller 40 or the wireless communications device 60. The wireless communications device 60 can then send this information to the backend facility 80 using the cellular chipset 64 or other communications means. For example, the user can use the touchscreen display 50 to enter a desired destination to which the user would like to travel to. The destination can include a physical address (e.g., 1234 Main Street, Central City, Mich.) or can include a point of interest, such as the fast charging station 90, or other geographical indicator. The destination can be represented in many forms, such as through geographical coordinates or textual data that is embodied in a vehicle navigational request message. A departure location can also be specified in the vehicle navigational request message. The departure location can be specified by the user via the vehicle-user interfaces, or may be determined or preset to be the vehicle's current location, which can be determined using GNSS receiver 22 or through use of other location services. This vehicle navigational request message can then be sent using the wireless communications device 60 (e.g., through SRWC circuitry 62 or cellular chipset 64) to the backend facility 80 or other remote computing system (e.g., computer 78), which can then provide navigational information to the vehicle 12. This navigational information can be displayed on the display 50, or may be presented via use of other vehicle-user interfaces that can be used for presenting output. The navigational information can provide the position and/or estimated time to reach a fast charging station 90.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to vehicle backend facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. In one embodiment, each such computer 78 can be used for one or more purposes, such as for providing navigational services to a plurality of vehicles and other electronic network computing devices, including vehicle 12 and personal mobile device 92. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; a fleet maintenance server which coordinates a number of fleet vehicles when vehicle 12 is part of a fleet; or a third party repository to or from which vehicle data or other information is provided, whether by communicating with the vehicle 12, backend facility 80, or both. A computer 78 can also be used for providing Internet connectivity such as DNS services or as a network address server that uses DHCP or other suitable protocol to assign an IP address to vehicle 12.

Vehicle backend facility 80 is located at a physical location that is located remotely from vehicle 12. The vehicle backend facility 80 may be designed to provide the vehicle electronics 20 with a number of different system back-end functions through use of one or more electronic servers 82 and, in many cases, may provide navigation-related services to a plurality of vehicles. In many embodiments, the backend facility 80 provides route suggestions (or a planned route), along with information relating to possible charging stations such as the fast charging station 90. The vehicle backend facility 80 includes vehicle backend servers 82 and databases 84, which may be stored on a plurality of memory devices. Vehicle backend facility 80 may include any or all of these various components and, preferably, each of the various components are coupled to one another via a wired or wireless local area network. Backend facility 80 may receive and transmit data via a modem connected to land network 76. Data transmissions may also be conducted by wireless systems, such as IEEE 802.11x, GPRS, and the like. Those skilled in the art will appreciate that, although only one backend facility 80 and one computer 78 are depicted in the illustrated embodiment, numerous backend facilities 80 and/or computers 78 may be used. Moreover, a plurality of backend facilities 80 and/or computers 78 can be geographically distributed and can each coordinate information and services with one another, as those skilled in the art will appreciate.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. This software may be stored in computer-readable memory and can be any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Backend facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases at the backend facility 80 can store various information and can include a vehicle energy usage database, geographical roadway information database, a database containing location related information for charging stations, a fleet database containing information for autonomous, semi-autonomous, or non-autonomous vehicle back-office schedules, as well as other vehicle information database(s).

The fast charging station 90 may be used to charge the RESS 30 of the vehicle 12. In the illustrated embodiment, the fast charging station 90 is a DC fast charge (DCFC) station that connects the RESS to the main power grid through an external charger. In this embodiment, the energy transfer output is about 50-120 kW, however other energy transfer outputs are possible (e.g., +350 kW). Typically, this will provide about 60-80 miles of range for about 20 minutes of charge. This may be limited in some instances, however, such as when ambient temperatures are low. Accordingly, the preconditioning method described herein can be used to help optimize charging efficiency when the RESS 30 is being charged by the fast charging station 90.

Method—

Figure 2:
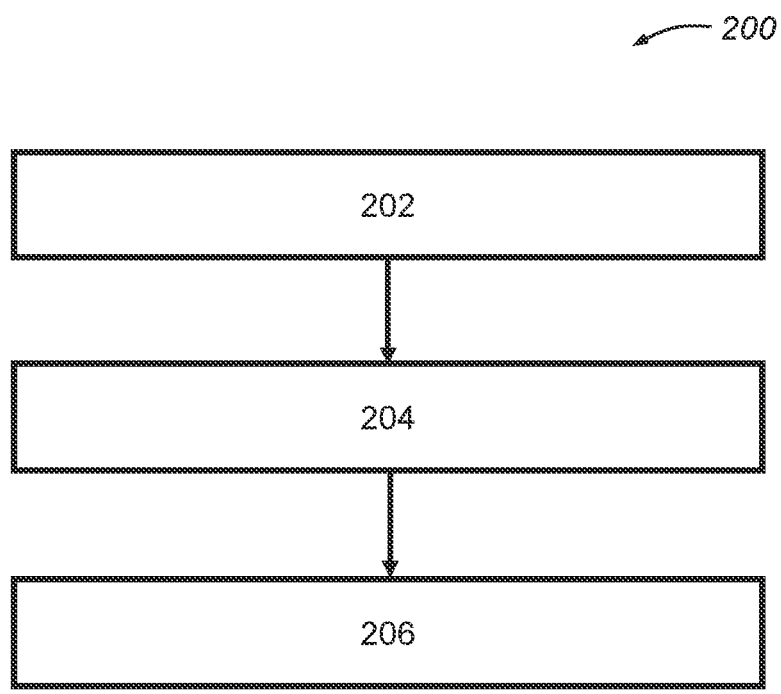
FIG. 2 is a flowchart illustrating an example embodiment of the preconditioning method disclosed herein.

FIG. 2 illustrates a method 200 for preconditioning a rechargeable energy storage system (RESS), described with respect to the operating environment 10 and RESS 30 of FIG. 1. It should be understood that some or all of the steps of the method 200 could be performed at the same time or in an alternative order than what is described below. Further, it is likely that the method 200 could be implemented in other systems that are different from the system illustrated in FIG. 1, and that the description of the method 200 within the context of the system 10 is only an example.

Step 202 of the method involves monitoring one or more rechargeable energy storage system (RESS) parameters. In one embodiment, the RESS parameters include the current SOC, the RESS or battery temperature, and the ambient temperature. The current SOC can be obtained from the SOC sensor 34. The RESS temperature can be obtained from the battery temperature sensor 36. The ambient temperature can be obtained from the ambient temperature sensor 48. The RESS parameters may also include the estimated range, which may be derived from the SOC, such as by using the controller 40. The RESS parameters may also include data relating to the estimated or next scheduled charging station. For example, a distance X to the fast charging station 90, as shown in FIG. 1, may be a RESS parameter. The distance X may be obtained via GNSS receiver 22, to cite one example, or via an application on mobile device 92 or otherwise through the backend facility 80, to cite other examples. An estimated or scheduled next time to charge may be a RESS parameter. For example, if the vehicle 12 is part of a fleet, charging may occur at certain intervals or at known instances. These time estimates may be RESS parameters. Aspects of the terrain may also be considered RESS parameters in some embodiments. For example, map data (obtained, for example, via GNSS receiver 22) may indicate that the route will have a steep grade or incline. This could require the use of more RESS resources. In yet another embodiment, the RESS parameters include a voltage of battery pack 32.

Figure 3:
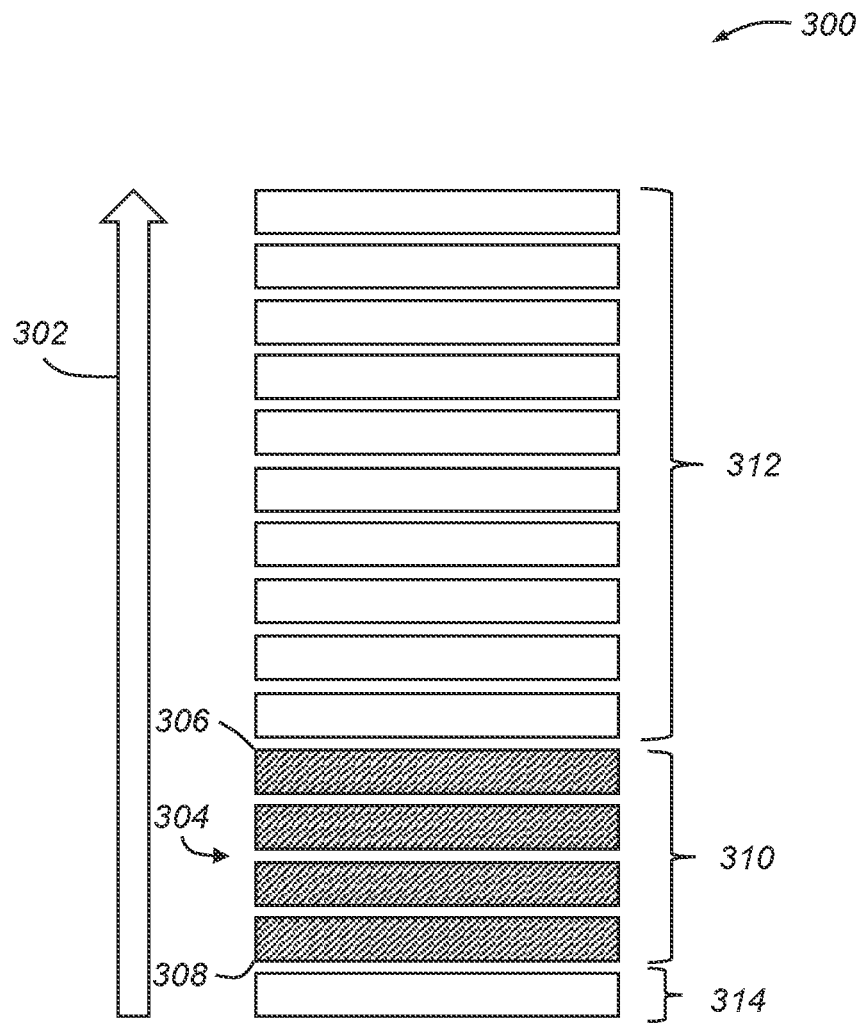
FIG. 3 schematically illustrates one embodiment of a RESS precondition window.

Step 204 of the method involves adjusting a RESS precondition window based on one or more of the monitored RESS parameters of step 202. The RESS precondition window comprises a RESS precondition start point, a RESS precondition end point, and a RESS precondition region between the start point and the end point. The RESS precondition window is calibratable and can be adjusted based on one or more of the RESS parameters. For example, in one embodiment, the RESS precondition window is an SOC-based window, as schematically illustrated in FIG. 3. During a particular SOC range (e.g., 15-45%, inclusive, or 20-40%, inclusive), the RESS 30 can be automatically preconditioned and maintained at a higher temperature while the vehicle 12 is propulsion active. In the embodiment illustrated in FIG. 3, the arrow 302 represents the entire available SOC (e.g., 0% SOC to 95% or 100% SOC). A RESS precondition window 304 comprises a RESS precondition start point 306 (e.g., 40% SOC), a RESS precondition end point 308 (e.g., 20% SOC), and a RESS precondition region 310 between the RESS precondition start point 306 and the RESS precondition end point 308. Two non-precondition RESS regions 312, 314, which will be detailed further below, exist on either end of the RESS precondition window 304. This is just one example of a RESS precondition window, as other window types are detailed further below. Further, in some embodiments, it is possible to have more than one RESS precondition window.

Returning to FIG. 2, the step 204 of adjusting the RESS precondition window involves a predictive focus on conditioning that is able to selectively enhance charging efficiency while controlling the use of RESS-based resources that may be needed for overall vehicle functionality. For example, a more static conditioning or preconditioning scheme may use more RESS-based resources than what is needed, thereby reducing range or causing other unintended consequences. The dynamic preconditioning method 200, which adjusts the RESS precondition window based on one or more monitored RESS parameters, can better apportion RESS-based resources in a way that promotes charging efficiency (e.g., can save a user both time and money at the fast charging station 90) without unnecessarily using energy to control the temperature of the RESS 30. The size of the RESS precondition window can be used to predict and advise a user of the vehicle 12 or the system 10 of the amount of time needed to precondition the RESS 30.

Adjusting the RESS precondition window can be accomplished by adjusting the RESS precondition start point, adjusting the RESS precondition end point, or both. The type and amount of adjustment in step 204 will be dependent upon various factors, such as qualities of the RESS system (e.g., battery type, size, etc.) and efficiency of the thermal preconditioning (e.g., type and/or efficiency of a heating and/or cooling system used for thermal preconditioning). In an advantageous embodiment, the RESS parameters of RESS temperature and/or ambient temperature are used to adjust the RESS precondition window. For example, if the ambient temperature is a certain value or within a certain range of values (e.g., between 0° C. and 5° C.) the RESS precondition window may be larger (e.g., 20-40% SOC) than when the ambient temperature is another certain value or within another certain range of values (e.g., between 5° C. and 10° C. with a precondition window of 20-30% SOC). Continuing with this example, the RESS precondition start point may correlate with the RESS temperature and/or the ambient temperature. For example, the RESS precondition end point may be constant, and the RESS precondition start point may be sooner with colder RESS temperatures and/or colder ambient temperatures such that the RESS precondition window is correspondingly larger when colder temperatures are experienced.

The RESS precondition end point can be set such that there is a non-precondition RESS region in particular instances (e.g. non-precondition RESS region 314 in FIG. 3). For example, the RESS precondition end point may be set to preserve RESS resources for other vehicle functions, such as propulsion. More particularly, RESS preconditioning may stop when there is about 15-25% SOC in order to allow for more range efficient use of the RESS 30 and to help abate range anxiety. In another example, the RESS precondition end point may be based on the distance or time expected until another charging session, such as the distance X to the fast charging station 90. The RESS precondition end point could also be based upon satisfaction of a certain criteria or event. Such an event may be the initiation of a charging session or energy transfer. Another example event or criteria may be reaching a particular RESS temperature. For example, the battery temperature sensor 36 may provide feedback to the controller 40, and the controller 40 may stop preconditioning efforts once a desired RESS temperature is reached. The RESS precondition end point may also be dependent on expected upcoming terrain, as provided via map data from GNSS receiver 22. If a steep uphill grade is expected before reaching the fast charging station 90, the RESS precondition end point may be sooner than if the terrain is generally level such that RESS resources can be allocated to more strenuous RESS demands.

In general, a non-precondition RESS region exists before the RESS precondition start point (e.g., non-precondition RESS region 312 in FIG. 3), and may also exist after the RESS precondition end point, as described above. In a non-precondition RESS region, no RESS thermal conditioning takes place. This is advantageous in that lower RESS temperatures are maintained during times in which the vehicle 12 is unlikely to charge. For example, it is unlikely for a user to initiate a fast charge when the SOC is 85-90%. Accordingly, in one particular embodiment, no thermal preconditioning will take place when the SOC is in this range. In some embodiments, two non-precondition RESS regions may exist on either side of the RESS precondition window. As the size of the RESS precondition window is adjusted, the size of the one or more non-precondition RESS regions correspondingly adjust.

Step 206 of the method involves prompting for or activating thermal preconditioning of the RESS 30. This step at least partially depends on the adjusted RESS precondition window. In an embodiment, thermal preconditioning may be dependent upon user input. This embodiment may be more ideal for non-autonomous or semi-autonomous implementations. For example, a user precondition prompt to initiate a battery or RESS warming mode may be presented to the user. Without input from the user, thermal preconditioning may not be initiated, despite being in a RESS precondition window. In one implementation, display 50 is used to provide a graphical user interface (GUI) for the user to precondition the RESS 30 prior to a fast charging session. In another implementation, prompts are provided to a user of the vehicle 12 via an application program on mobile device 92. The application program may be used to turn on/off a thermal preconditioning mode or provide the user with notifications. Other HMI-based or vehicle-user interface-based implementations are certainly possible.

Figure 4:
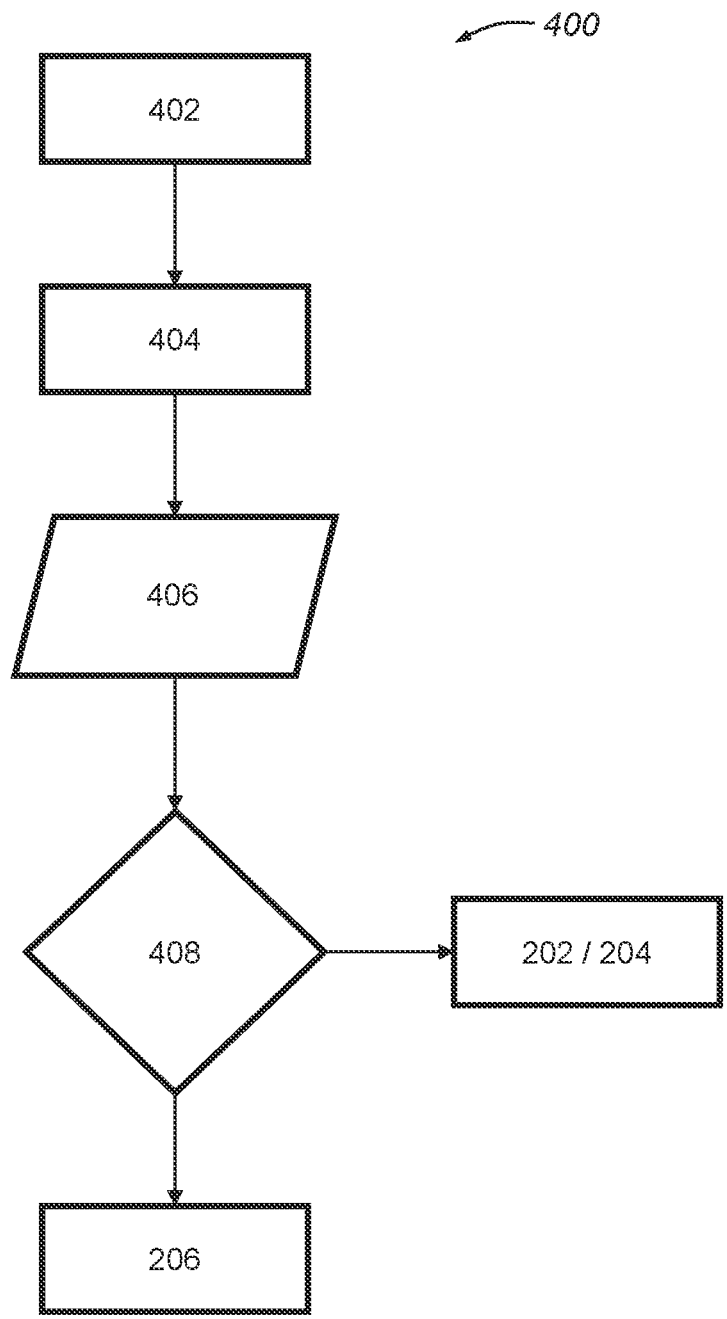
FIG. 4 is a flowchart illustrating an example embodiment of a preconditioning method.

FIG. 4 is a flowchart illustrating steps of a preconditioning method 400 that is based on user input. In step 402, the method ascertains and/or adjusts the RESS precondition window (e.g., steps 202 and 204 of FIG. 2). This step may also calculate an estimated time until the RESS precondition start point. This may be accomplished through evaluation of the one or more RESS parameters. For example, if the RESS precondition start point is 40% SOC and the current battery SOC is 50% as determined by the SOC sensor 34, the controller 40 may calculate the amount of time estimated for the SOC to drop 10%. This may be accomplished by evaluating the ambient temperature, the expected route, the terrain on the expected route, etc.

In step 404 of FIG. 4, the time calculated in step 402 is presented to the user of the vehicle 12. This may be accomplished via display 50, to cite one example. This step is optional and can give the user an idea of when thermal preconditioning may be desirable. Also, in this step, a more general user preconditioning prompt (e.g., activate RESS, initiate thermal preconditioning mode or battery warming mode) may be presented to the user. This prompt may be presented during the time period calculated in step 402.

In step 406, user input is received regarding thermal preconditioning. The method then continues to step 408 to ask whether the user would like to precondition the RESS 30 to optimize charge efficiency. If the user does not want to precondition the RESS 30, the method continues to steps 202/204 of FIG. 2 in order to monitor the one or more RESS parameters and adjust the RESS precondition window as needed. If the user does want to precondition the RESS, the method continues to step 206 of FIG. 2 in order to activate thermal preconditioning. It is also possible to display or otherwise notify the user when the RESS 30 reaches the desired temperature. This can be useful because it allows the user to wait until the RESS precondition end point is reached before initiating a charge at the fast charging station 90. This will promote a more efficient energy transfer, which can save the user both time and money.

Figure 5:
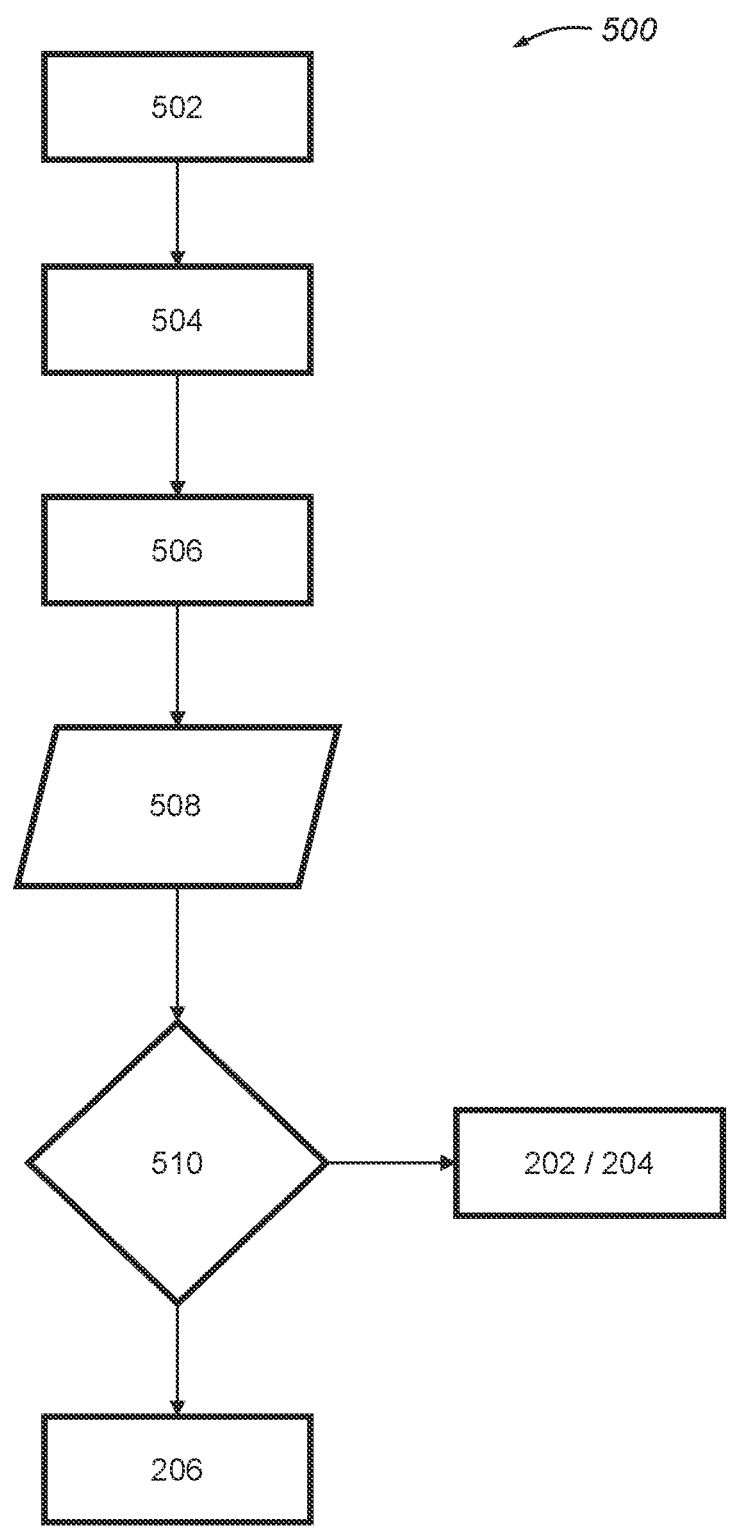
FIG. 5 is a flowchart illustrating another example embodiment of a preconditioning method.

FIG. 5 illustrates another example preconditioning method 500. FIG. 5 is a proximity-based example in which the location of the fast charging station 90 is used as one of the RESS parameters. Additionally, this example includes a multi-faceted analysis using multiple RESS parameters, including SOC and temperature (RESS temperature and/or ambient temperature). In step 502, the method ascertains and/or adjusts the RESS precondition window, and this step may also include calculating an estimated time until the RESS precondition start point (e.g., steps 202 and 204 of FIG. 2). As with step 402 of FIG. 4, if the RESS precondition start point is 40% SOC and the current battery SOC is 50%, the controller 40 may calculate the amount of time estimated for the SOC to drop 10%. This may be accomplished by evaluating the ambient temperature, the expected route, the terrain on the expected route, etc.

Step 504 calculates the time to the nearest or selected fast charging station 90. This step may be accomplished with map data received from GNSS receiver 22 that provides an estimated distance X or route to the fast charging station 90 with crowd sourced traffic information or the like such that a time can be calculated. In one embodiment, the GPS coordinates and/or media access control address (MAC address) of the most used charger may be obtained such that the RESS can be preconditioned when within a calibratable proximity to the charging station 90. This step may also be accomplished by receiving charging station information from the backend facility 80 via wireless communication device 60.

Step 506 prompts the user when the time to the fast charging station 90 (step 504) meets or is within a prescribed range of the time until the RESS precondition start point (step 502). For example, if the time until the RESS precondition start point is 30 minutes (e.g., it will take 30 minutes to heat the battery pack 32 to the desired RESS precondition temperature) and the fast charging station is 40 minutes away, a prompt to initiate preconditioning or a battery warming mode may be presented to the user in the 10 minute period between the time to the fast charging station and the time to the RESS precondition start point.

In step 508, similar to step 406 in FIG. 4, user input is received regarding thermal preconditioning. The method then continues to step 510 to ask whether the user would like to precondition the RESS 30 to optimize charge efficiency. If the user does not want to precondition the RESS 30, the method 500 continues to steps 202/204 of FIG. 2 in order to monitor the one or more RESS parameters and adjust the RESS precondition window. If the user does want to precondition the RESS, the method 500 continues to step 206 of FIG. 2 in order to activate thermal preconditioning. If the user input is received before reaching the RESS precondition start point, the method 500 may wait to initiate thermal preconditioning until the RESS precondition start point is reached. As with the method 400, it is also possible to display or otherwise notify the user when the RESS 30 reaches the desired temperature. With both methods 300, 400, if the user does not want to precondition the RESS at the RESS precondition window start point, the prompt may stay available such that the user can activate thermal preconditioning at any point during the RESS precondition region.

Returning to FIG. 2, step 206 may involve automatic activation of thermal preconditioning. For example, once the RESS precondition start point is met, the controller 40 may send a signal to heater 38 to initiate thermal preconditioning until the RESS precondition end point is met. At that point, the controller 40 may stop thermal preconditioning. In this embodiment, it may be possible to provide a prompt to the user to cancel thermal preconditioning, such that thermal preconditioning may automatically occur unless the RESS 30 receives user input to the contrary.

Figure 6:
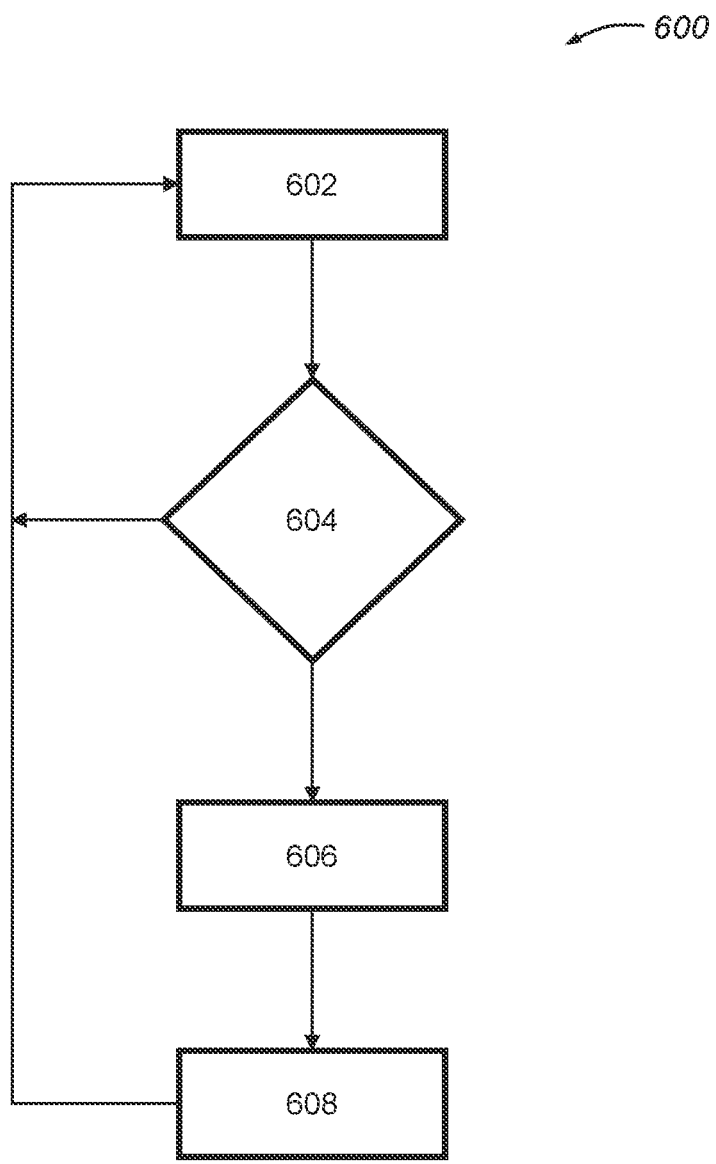
FIG. 6 is a flowchart illustrating yet another example embodiment of a preconditioning method.

FIG. 6 illustrates one example method 600 of automatically activating thermal preconditioning. This method may be implemented with a fleet of autonomous vehicles, for example. With autonomous vehicles and/or fleet vehicles, the preconditioning methods described herein can provide for better utilization of limited charging resources. Step 602 involves receiving a back-office schedule, such as from backend facility 80. Typically, the back-office schedule will include a log of all fleet vehicles, where they are located, and the expected next course of action. Step 604 asks whether the vehicle, such as vehicle 12, is going to charge or energy transfer. If not, the back-office schedule is monitored until the fleet vehicle 12 is expected to charge. These steps may be accomplished via software stored on memory 84 and executed via processor 82. When the vehicle 12 is expected to charge, the method 600 moves to step 606 ascertain and/or adjust the RESS precondition window, which may also include determining when the RESS precondition start point is expected to be reached (e.g., steps 202 and 204 of FIG. 2). This step is optional, as in some embodiments, thermal preconditioning may be initiated as soon as it is determined that the vehicle 12 is going to charge, or automatically when the RESS precondition start point is met. Step 608 starts thermal preconditioning when the time to the fast charging station 90 is less than the time prescribed by the RESS precondition window. Accordingly, the vehicle 12 can be preconditioned in advance of the charging session, which can reduce downtime for fleet vehicles and more efficiently use oftentimes limited charging resources. The method 600 may also be useful in other non-fleet-based or non-autonomous implementations. For example, the method 600 may be useful in automatic preconditioning methods where the route is known from the GNSS receiver 22. Additionally, the method 600 may be useful when the driving habits or usual excursions are known. For example, the mobile device 92 could know from a user's schedule that the user goes to work every day at 7:00 am and charge while at work. The preconditioning could be tied to this known schedule.

Again returning to step 206 of FIG. 2, whether the initiation of thermal preconditioning is automatic or via a user prompt, the thermal preconditioning can help maximize charging efficiency when the vehicle 12 is charged at the fast charging station 90. As addressed, above, in one embodiment, thermal preconditioning may involve actively cooling the RESS 30 to a desired temperature that improves charging efficiency. In another embodiment, thermal preconditioning includes increasing a temperature of the RESS 30. If ambient temperature is a RESS parameter, the increase in temperature of the RESS 30 may be proportional to an expected loss of charging efficiency due to the ambient temperature. A look-up table or another data structure with the charging efficiencies for various temperatures or temperature ranges may be used to accomplish this. For example, the expected loss of charging efficiency may be a percentage of what is actually being delivered through the fast charging station 90. The thermal conditioning may increase the temperature of the RESS such that a maximum expected percentage is accomplished. In one particular example, for a 55 kW fast charging station 90, it may be possible to get 20 kW at 15° C. However, if the RESS 30 is heated to 25° C. (a temperature increase of 10° C.), it may be possible to get 50 kW. Accordingly, the amount of temperature increase in this example is 10° C. to get a 150% increase in charging efficiency. In some embodiments, the step of increasing the temperature of the RESS 30 increases the RESS temperature to a value higher than an average operational temperature of the RESS 30. In other words, the RESS temperature in the RESS precondition window is higher than the RESS temperature in a non-precondition RESS region such that a lower RESS temperature is maintained outside of the RESS precondition window. A higher RESS temperature can better prevent lithium plating if the RESS 30 includes a lithium-ion battery pack 32. For higher power charging (e.g., greater than or equal to 350 kW), the lithium plating related benefits are even more tangible, as with higher voltages, lithium plating is more likely.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A method of preconditioning a rechargeable energy storage system of a vehicle, the method comprising the steps of:
    monitoring one or more rechargeable energy storage system parameters;
    adjusting a rechargeable energy storage system precondition window based on one or more of the monitored rechargeable energy storage system parameters, wherein the rechargeable energy storage system precondition window comprises a rechargeable energy storage system precondition start point, a rechargeable energy storage system precondition end point, and a rechargeable energy storage system precondition region between the rechargeable energy storage system precondition start point and the rechargeable energy storage system precondition end point; and
    prompting for or activating thermal preconditioning of the rechargeable energy storage system depending on the adjusted rechargeable energy storage system precondition window, wherein thermal preconditioning for charging takes place while the vehicle is propulsion active, and wherein a controller is programmed to implement the monitoring step, the adjusting step, and/or the prompting for or activating step.

2. The method of claim 1, wherein the thermal preconditioning of the rechargeable energy storage system includes increasing a temperature of the rechargeable energy storage system.

3. The method of claim 2, wherein increasing the temperature of the rechargeable energy storage system increases the temperature in an amount that is proportional to an expected loss of charging efficiency.

4. The method of claim 2, wherein increasing the temperature of the rechargeable energy storage system increases the temperature of the rechargeable energy storage system to a value higher than an average operational temperature of the rechargeable energy storage system.

5. The method of claim 2, wherein a lower rechargeable energy storage system temperature is maintained outside of the rechargeable energy storage system precondition window as compared to a temperature of the rechargeable energy storage system during thermal preconditioning.

6. The method of claim 1, wherein the one or more rechargeable energy storage system parameters includes a state of charge (SOC), and the rechargeable energy storage system precondition window is an SOC-based window.

7. The method of claim 6, wherein the rechargeable energy storage system precondition region is between 20-40% state of charge (SOC), inclusive.

8. The method of claim 6, wherein the rechargeable energy storage system parameters include an ambient temperature or a rechargeable energy storage system temperature.

9. The method of claim 8, wherein the rechargeable energy storage system precondition start point correlates with the ambient temperature or the rechargeable energy storage system temperature.

10. The method of claim 6, wherein a non-precondition rechargeable energy storage system region exists between a maximum state of charge (SOC) and the rechargeable energy storage system precondition start point.

11. The method of claim 10, wherein the non-precondition rechargeable energy storage system region allows for more range efficient use of the rechargeable energy storage system than an activated thermal preconditioning mode.

12. The method of claim 1, wherein the prompting for or activating step includes calculating a time period until the rechargeable energy storage system precondition start point is expected to be reached.

13. The method of claim 12, wherein a user precondition prompt is presented to a user of the vehicle during the time period.

14. The method of claim 1, wherein the one or more rechargeable energy storage system parameters includes an estimated distance to a fast charging station.

15. The method of claim 1, wherein the one or more rechargeable energy storage system parameters includes an estimated time to a fast charging station.

16. The method of claim 1, wherein the one or more rechargeable energy storage system parameters includes an autonomous schedule.

17. The method of claim 1, wherein the rechargeable energy storage system precondition end point preserves rechargeable energy storage system capacity in a non-precondition rechargeable energy storage system region.

18. A method of preconditioning a rechargeable energy storage system of a vehicle, the method comprising the steps of:
monitoring a plurality of rechargeable energy storage system parameters, wherein the plurality of rechargeable energy storage system parameters includes a state of charge (SOC) and an ambient or rechargeable energy storage system temperature;
adjusting an SOC-based rechargeable energy storage system precondition window based on the ambient or rechargeable energy storage system temperature, wherein the SOC-based rechargeable energy storage system precondition window comprises a rechargeable energy storage system precondition start point, a rechargeable energy storage system precondition end point, and a rechargeable energy storage system precondition region between the rechargeable energy storage system precondition start point and the rechargeable energy storage system precondition end point; and
prompting for or activating thermal preconditioning of the rechargeable energy storage system depending on the adjusted SOC-based rechargeable energy storage system precondition window, wherein thermal preconditioning for charging takes place while the vehicle is propulsion active, and wherein a controller is programmed to implement the monitoring step, the adjusting step, and/or the prompting for or activating step.

19. A rechargeable energy storage system for a vehicle, comprising:
a battery;
a heater; and
a controller programmed to monitor one or more rechargeable energy storage system parameters, adjust a rechargeable energy storage system precondition window based on one or more of the monitored rechargeable energy storage system parameters, wherein the rechargeable energy storage system precondition window comprises a rechargeable energy storage system precondition start point, a rechargeable energy storage system precondition end point, and a rechargeable energy storage system precondition region between the rechargeable energy storage system precondition start point and the rechargeable energy storage system precondition end point, and prompt for or activate thermal preconditioning depending on the adjusted rechargeable energy storage system precondition window, wherein thermal preconditioning for charging uses the heater to heat the battery and takes place while the vehicle is propulsion active.

* * * * *